(12) United States Patent  
Kigasawa

(10) Patent No.: US 7,769,227 B2  
(45) Date of Patent: Aug. 3, 2010

(54) OBJECT DETECTOR

(75) Inventor: Seiji Kigasawa, Kanagawa (JP)

(73) Assignee: Panasonic Corporation, Osaka (JP)

( * ) Notice: Subject to any disclaimer, the term of this patent is extended or adjusted under 35 U.S.C. 154(b) by 817 days.

(21) Appl. No.: 11/574,887

(22) PCT Filed: Aug. 30, 2005

(86) PCT No.: PCT/JP2005/015747

§ 371 (c)(1),  
(2), (4) Date: Mar. 8, 2007

(87) PCT Pub. No.: WO2006/030633

PCT Pub. Date: Mar. 23, 2006

(65) Prior Publication Data

US 2008/0056534 A1    Mar. 6, 2008

(30) Foreign Application Priority Data

Sep. 15, 2004   (JP) ............................. 2004-268267

(51) Int. Cl.  
*G06K 9/00* (2006.01)

(52) U.S. Cl. .................. 382/154; 382/107; 382/190; 382/192; 382/201; 382/218

(58) Field of Classification Search .................. 382/154, 382/107, 190, 192, 201, 218  
See application file for complete search history.

(56) References Cited

U.S. PATENT DOCUMENTS 5,331,949 A * 7/1994 Funakoshi et al. .......... 600/109  
6,205,242 B1 * 3/2001 Onoguchi ................. 382/154  
6,556,775 B1 * 4/2003 Shimada .................. 386/121  
2003/0007680 A1 * 1/2003 Iijima et al. ............. 382/154

FOREIGN PATENT DOCUMENTS

| JP | 8-272929 | 10/1996 |
|----|----------|---------|
| JP | 9-97337 | 4/1997 |
| JP | 9-297849 | 11/1997 |
| JP | 2002-150295 | 5/2002 |

OTHER PUBLICATIONS

Katsumasa Onda, Seiji Kegasawa, Masato Nishizawa, Yasayuki Domoto, "Stereo Gazo Shori ni yoru Shinnyusha Kenshutsu Gijutsu no Kaihatsu", Dai 5 Kai Gazo Sensing Symposium Koen Ronbunshu, Jun. 17, 1999, pp. 57 to 59.  
Saneyoshi et al; "Drive Assist System By Means of 3-D Image Recognition Technique", Subaru Research Center; Proceedings of Technical Paper Presentation, 924, pp. 169-172, (Oct. 1992).

* cited by examiner

*Primary Examiner*—Matthew C Bella  
*Assistant Examiner*—Mike Rahmjoo  
(74) *Attorney, Agent, or Firm*—Pearne & Gordon LLP

(57) ABSTRACT

An object detector includes a brightness change calculating section (103) that calculates the change in brightness in an image, a three-dimensional object detecting section (105) that uses three-dimensional information measured from a plurality of images to detect a three-dimensional object, an object candidate extracting section (106) that refers to the three-dimensional object detection results and the brightness change calculation result to extract a moving object candidate area and a still object candidate area, and an object judging section (107) that judges whether or not the candidate area is an object. In this way, the object detector refers to the change in brightness in the area detected as a three-dimensional object to judge whether the detected three-dimensional object is a moving object or a still object. Therefore, a still object in the image can be accurately detected without using background difference processing.

9 Claims, 9 Drawing Sheets

THREE-DIMENSIONAL OBJECT AREA 501

LABEL NUMBER 502

LABELING RESULT 503

OBJECT DETECTOR

TECHNICAL FIELD

The present invention relates to an object detector (or an object detecting device) that detects an object by image recognition from images obtained by imaging a monitoring space.

BACKGROUND ART

An inter-frame difference method and a background difference method are known as prior art for detecting an in-image object. For example, in the object detector configured according to the block diagram shown in FIG. 10, a camera 1011 images an object and background, and an A-to-D converter 1012 converts the analog signal of the image captured from the camera 1011 into a digital signal.

A present input image accumulating section 1013 accumulates present images sent from the A-to-D converter 1012, that is, present image inputs. A preceding input image accumulating section 1014 accumulates images of preceding frames obtained before the present input image sent from the present input image accumulating section 1013, that is, preceding input images. A background updating section 1015 updates the background using a predetermined background update procedure. A background image accumulating section 1016 accumulates the background images generated in the background updating section 1015.

A time difference and binarizing section 1017 calculates the difference between the present input image sent from the present input image accumulating section 1013 and the preceding input image sent from the preceding input image accumulating section 1014, that is, performs differential processing. The time difference and binarizing section 1017 uses a predetermined threshold value to binarize the image signal that has undergone the differential processing into 1 or 0. A background difference and binarizing section 1018 calculates the difference between the present input image sent from the present input image accumulating section 1013 and the background image sent from the background image accumulating section 1016. The background difference and binarizing section 1018 uses a predetermined threshold value to binarize the image signal that has undergone the differential processing into 1 or 0.

A moving object area image extracting section 1019 extracts the area that includes only a moving object from the whole image area. A moving object area image accumulating section 1020 binarizes the image from the moving object area extracting section 1019 and stores the binarized image. A still object area image extracting section 1021 extracts the area that includes only a still object from the whole image area. A still object area image accumulating section 1022 binarizes the image from the still object area extracting section 1021 and stores the binarized image.

Furthermore, a detection result judging section 1023 judges whether or not the detected still object is false based on the moving object area image sent from the moving object area image accumulating section 1020 and the still object area image sent from the still object area image accumulating section 1022. A judged still object area image accumulating section 1024 accumulates two-dimensional images, each of which is image data obtained by adding the judgment result from the detection result judging section 1023 to the still object area. Finally, an event sensing section 1025 receives the judgment result from the detection result judging section 1023 and uses a predetermined procedure to sense an event within the imaging region of the camera 1011.

In the prior art, by thus combining the frame difference and the background difference, a moving object and a still object are detected. In the prior art, the background image is updated only for the area where no object is present based on the detection result. Such prior art is disclosed in Japanese Patent Laid-Open No. 2002-150295 (pages 2 to 8, FIG. 1).

However, in the conventional object detection method, the background difference is used to detect a still object. Thus, a false object detection result will not correctly update the background, which disadvantageously affects the following detection result.

The present invention has been made in view of the above circumstances. An object of the present invention is to provide an object detector capable of accurately detecting a still object without using background difference.

DISCLOSURE OF THE INVENTION

An aspect of the present invention is an object detector (or an object detecting device). The object detector includes a plurality of imaging sections that image a predetermined monitoring space, an image storage section that stores at least one of a plurality of images imaged by the plurality of imaging sections, a brightness change calculating section that calculates the amount of change in brightness (variation in luminance) between the stored preceding image and the present image, a three-dimensional information calculating section that calculates three-dimensional information from the plurality of images imaged by the plurality of imaging sections, a three-dimensional object detecting section that detects a three-dimensional object in the monitoring space based on the three-dimensional information calculated by the three-dimensional information calculating section, and an object candidate extracting section that extracts an object showing a large brightness change as a moving object candidate and an object showing a small brightness change as a still object candidate based on the change in brightness in the image area corresponding to the object detected by the three-dimensional object detecting section.

Another aspect of the present invention is an object detection system. The object detection system includes the object detector described above and a storage device that stores the image when the object detector has detected an object and/or specification information on the detected object.

Another aspect of the present invention is a method for detecting an object. The method for detecting an object includes the steps of using a plurality of imaging sections to image a predetermined monitoring space, storing at least one of a plurality of images imaged by the plurality of imaging sections, calculating the amount of change in brightness between the stored preceding image and the present image, calculating three-dimensional information from the images imaged by the plurality of imaging sections, detecting an object in the monitoring space based on the three-dimensional information, and extracting an object showing a large brightness change as a moving object candidate and an object showing a small brightness change as a still object candidate based on the change in brightness in the image area corresponding to the detected object.

The present invention has other aspects as described below. Therefore, the disclosure of the present invention is intended to provide part of the aspects of the present invention but is not intended to limit the scope of the present invention set forth and claimed in the present application.

DESCRIPTION OF SYMBOLS

Figure 1:
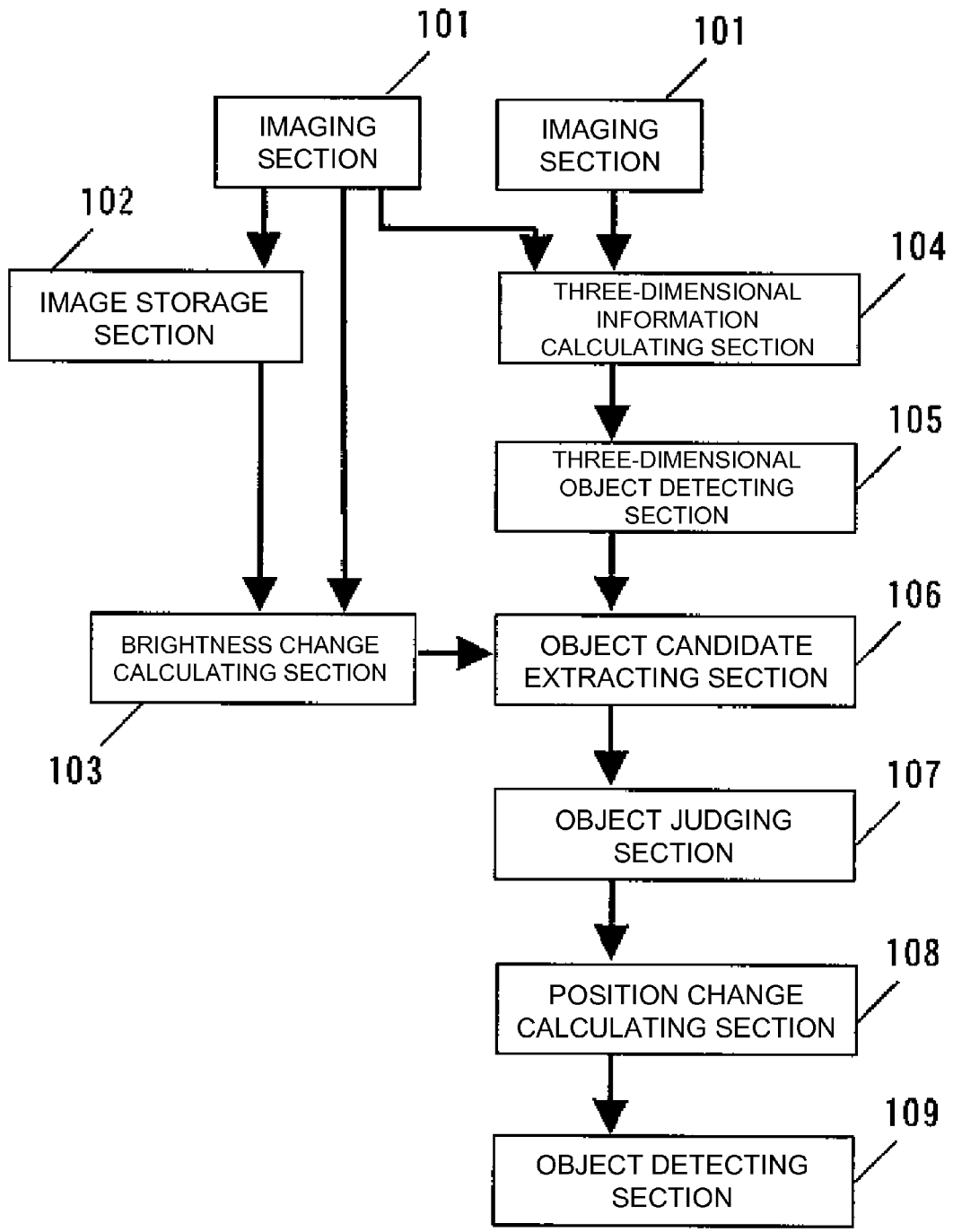
FIG. 1 is a block diagram of the object detector according to the first embodiment of the present invention.

101 IMAGING SECTION
102 IMAGE STORAGE SECTION
103 BRIGHTNESS CHANGE CALCULATING SECTION
104 THREE-DIMENSIONAL INFORMATION CALCULATING SECTION
105 THREE-DIMENSIONAL OBJECT DETECTING SECTION
106 OBJECT CANDIDATE EXTRACTING SECTION
107 OBJECT JUDGING SECTION
108 POSITION CHANGE CALCULATING SECTION
109 OBJECT DETECTING SECTION
301 LEFT IMAGE
302 RIGHT IMAGE
303, 304 BLOCK
305 SEARCH REGION
401 OBJECT
402 THREE-DIMENSIONAL INFORMATION AT REFERENCE TIME
403 THREE-DIMENSIONAL INFORMATION AT PRESENT TIME
501 THREE-DIMENSIONAL OBJECT AREA
502 LABEL NUMBER
503 LABELING RESULT
601 MOVING OBJECT
602 STILL OBJECT
603 OBJECT INFORMATION
604 DIFFERENCE INFORMATION
605 MOVING OBJECT CANDIDATE
606 STILL OBJECT CANDIDATE
701 OBJECT DIVIDING SECTION
702 OBJECT CANDIDATE EXTRACTING SECTION
801 CANDIDATE AREA STORAGE SECTION
802 CANDIDATE AREA INTEGRATING SECTION
901 OBJECT DETECTOR
902 STORAGE DEVICE

BEST MODE FOR CARRYING OUT THE INVENTION

The present invention will be described below in detail. However, the following detailed description and the accompanying drawings are not intended to limit the present invention. Instead, the scope of the present invention is defined by the accompanying claims.

The object detector of the present invention includes a plurality of imaging sections that image a predetermined monitoring space, an image storage section that stores at least one of a plurality of images imaged by the plurality of imaging sections, a brightness change calculating section that calculates the amount of change in brightness between the stored preceding image and the present image, a three-dimensional information calculating section that calculates three-dimensional information from the plurality of images imaged by the plurality of imaging sections, a three-dimensional object detecting section that detects a three-dimensional object in the monitoring space based on the three-dimensional information calculated by the three-dimensional information calculating section, and an object candidate extracting section that extracts an object showing a large brightness change as a moving object candidate and an object showing a small brightness change as a still object candidate based on the change in brightness in the image area corresponding to the object detected by the three-dimensional object detecting section. This configuration allows accurate detection of a still object without using background difference processing.

The object detector may include an object judging section that judges that the object candidate area is an object when the object candidate area is larger than a predetermined threshold value, a position change calculating section that calculates the change in position only for an object judged as a moving object, and an object detecting section that detects only an object that has undergone a predetermined motion. This configuration allows preferable object detection.

The object detector may include an object dividing section that divides the image area corresponding to the detected object based on the three-dimensional information into the portion showing a large brightness change and the portion showing a small brightness change. This configuration allows separation between a moving object and a still object as well as accurate detection of the moving object.

The object detector may include a candidate area storage section that stores the still object candidate area, a candidate area integrating section that integrates the still object candidate areas stored during a predetermined continuous period so as to generate an integrated area, and an object judging section that detects the integrated area as a still object when the size of the integrated area is larger than a predetermined threshold value. This configuration allows easier capture of the feature of a still object and accurate detection of the still object.

The object detection system of the present invention includes the object detector described above and a storage device that stores the image when the object detector has detected an object and/or specification information on the detected object. This configuration allows detection of an object that has undergone a predetermined motion and storage of the information on the object.

The method for detecting an object of the present invention includes the steps of using a plurality of imaging sections to image a predetermined monitoring space, storing at least one of a plurality of images imaged by the plurality of imaging sections, calculating the amount of change in brightness between the stored preceding image and the present image, calculating three-dimensional information from the images imaged by the plurality of imaging sections, detecting an object in the monitoring space based on the three-dimensional information, and extracting an object showing a large brightness change as a moving object candidate and an object showing a small brightness change as a still object candidate based on the change in brightness in the image area corresponding to the detected object. This method allows accurate detection of a still object without using background difference processing.

The method for detecting an object may detect an object candidate area as an object when the object candidate area is larger than a predetermined threshold value, calculate the change in position only for the object judged as a moving object, and detect the object that has undergone a predetermined motion. This method allows preferable object detection.

The method for detecting an object may divide the image area corresponding to the detected object based on the three-dimensional information into the portion showing a large brightness change and the portion showing a small brightness change so as to detect the moving object candidate and the still object candidate. This method allows separation between a moving object and a still object as well as accurate detection of the moving object.

The method for detecting an object may store the still object candidate area, integrate the still object candidate areas stored during a predetermined continuous period to generate an integrated area and detect the integrated area as a still object when the size of the integrated area is larger than a predetermined threshold value. This method allows easier capture of the feature of a still object and accurate detection of the still object.

As described above, the present invention provides a technology by which a still object can be detected without using background difference processing.

The object detector according to embodiments of the present invention will be described below with reference to the drawings.

FIG. 1 shows the object detector according to a first embodiment of the present invention.

In FIG. 1, the object detector according to this embodiment of the present invention includes a plurality of imaging sections 101 that image a predetermined space, an image storage section 102 that stores at least one of a plurality of images imaged by the plurality of imaging sections 101, a brightness change calculating section 103 that calculates the amount of change in brightness between the preceding image stored in the image storage section 102 and the present image, a three-dimensional information calculating section 104 that measures three-dimensional information from the plurality of images imaged by the plurality of imaging sections 101, a three-dimensional object detecting section 105 that detects a three-dimensional object in the monitoring space based on the three-dimensional information calculated by the three-dimensional information calculating section 104, an object candidate extracting section 106 that extracts a moving object candidate and a still object (static object) candidate based on the information on the object detected by the three-dimensional object detecting section 105 and the amount of change in brightness calculated by the brightness change calculating section 103, an object judging section 107 that judges that the candidate area extracted by the object candidate extracting section 106 is an object when the candidate area is larger than a predetermined threshold value, a position change calculating section 108 that calculates the change in position only for an object judged as a moving object, and an object detecting section 109 that detects only an object that has undergone a predetermined motion.

In FIG. 1, the imaging section 101 is formed of a camera including an imaging element, such as a CCD. Then, a plurality of the imaging sections 101 form a stereoscopic camera. Various elements associated with image processing are formed of a computer. The function of each block may be implemented by software. The computer may be provided in the camera.

The operation of the thus configured object detector will now be described.

Firstly, the plurality of imaging sections 101 image the predetermined imaging space and the image storage section 102 successively stores images. Images to be stored may be at least one of the plurality of images obtained from the plurality of imaging sections 101. Then, the brightness change calculating section 103 calculates the amount of change in brightness between the preceding image stored in the image storage section 102 and the present image. For example, brightness difference Diff(X, Y) is calculated as the amount of change in brightness. Let IMG0(X, Y) be the preceding image and IMG1(X, Y) be the present image. Then, the difference Diff (X, Y) is expressed by the following equation:

$$\mathrm{Diff}(X,Y)=IMG1(X,Y)-IMG0(X,Y)$$

The amount of change in brightness is calculated on a pixel basis. Alternatively, the amount of change in brightness may be calculated on a multiple-pixel area basis. Still alternatively, a normalized correlation value may be used in place of a difference value.

The difference value Diff(X, Y) is then compared with a predetermined threshold value DTH.

$$\mathrm{Diff}(X,Y) \geq DTH$$

When the above equation is satisfied, the pixels in question are considered to have a difference. Then, difference information SBN(X, Y) is set as follows:

$$SBN(X,Y)=1$$

Otherwise, the difference information SBN(X, Y) is set as follows:

$$SBN(X,Y)=0$$

Then, the three-dimensional information calculating section 104 uses stereo image processing to calculate three-dimensional information from the plurality of images obtained by the plurality of imaging sections 101.

Figure 2:
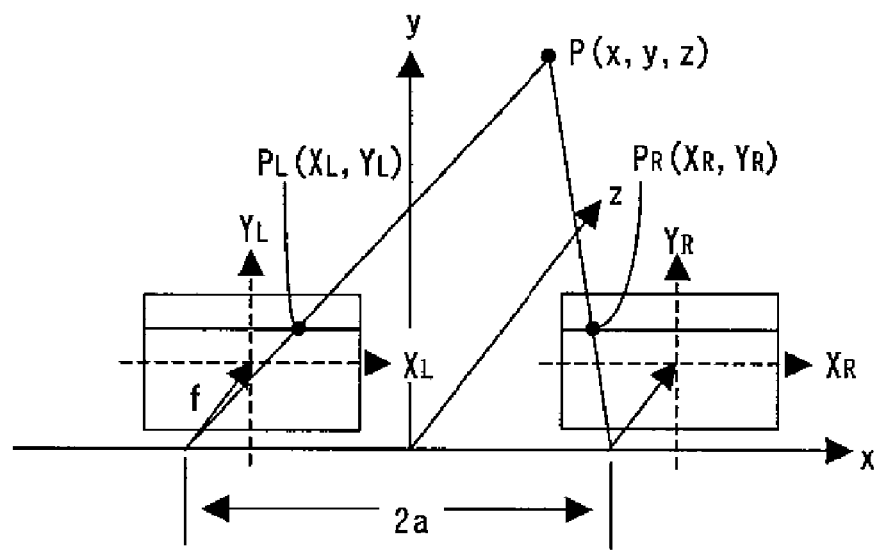
FIG. 2 explains the stereo image processing-based three-dimensional information measurement method according to the first embodiment of the present invention.

A method for using stereo image processing to measure three-dimensional information will now be described with reference to FIG. 2. In FIG. 2, let x, y and z be the coordinates used in the real space coordinate system, and X and Y be the coordinates used in the camera coordinate system. To distinguish two imaging sections, let XL and YL be the coordinates used in the imaging plane of the left camera, and XR and YR be the coordinates used in the imaging plane of the right camera. The x, XL and XR axes are parallel to each other, and the y, YL and YR axes are parallel to each other. Furthermore, z axis is parallel to the optical axes of the two imaging sections. The origin O of the real space coordinate system is set at the midpoint between the projection centers of the left and right cameras. The distance between the projection centers is expressed as $2a$. The distance between the projection center and the image plane (focal length) is expressed as f.

Suppose that a point p(x, y, z) in the real space is focused onto a point PL (XL, YL) in the left image plane and a point PR (XR, YR) in the right image plane. The stereo image processing-based three-dimensional measurement will be performed with reference to one of the image planes (the left image plane in this description). The point corresponding to the point PL in the reference image plane will be found in the other image plane. Then, the spatial coordinates (x, y, z) of the point p are determined based on the principle of triangulation. In this description, since the two cameras are installed such that the optical axes thereof are parallel to each other and lie in the same plane, the following equation is satisfied: YR=YL.

The relationship between the coordinates in the image planes and the coordinates in the real space is as follows:

$$x = a(XL+XR)/(XL-XR)$$

$$y = 2aYL/(XL-XR)$$

$$z = 2af/(XL-XR)$$

where d=XL−XR is referred to as a parallax.

Accordingly, the following equations are obtained:

$$XL = (x+a)f/z$$

$$XR = (x-a)f/z$$

$$YL = YR = yf/z$$

Therefore, the following relationship holds true:

$$XL > XR \text{ and } YL = YR$$

The above equations indicate that the one point PL in one of the image planes corresponds to the point PR in the other image plane; the point PR is on the same scan line as the point PL; and the point PR is in the region that satisfies the following equation: XL>XR. Therefore, providing that a point in one of the image planes corresponds to a point in the other image plane, the point in the other image plane can be found by checking the similarity of an image in a small area along a line on which the corresponding point is likely present (the same scan line).

Figure 3:
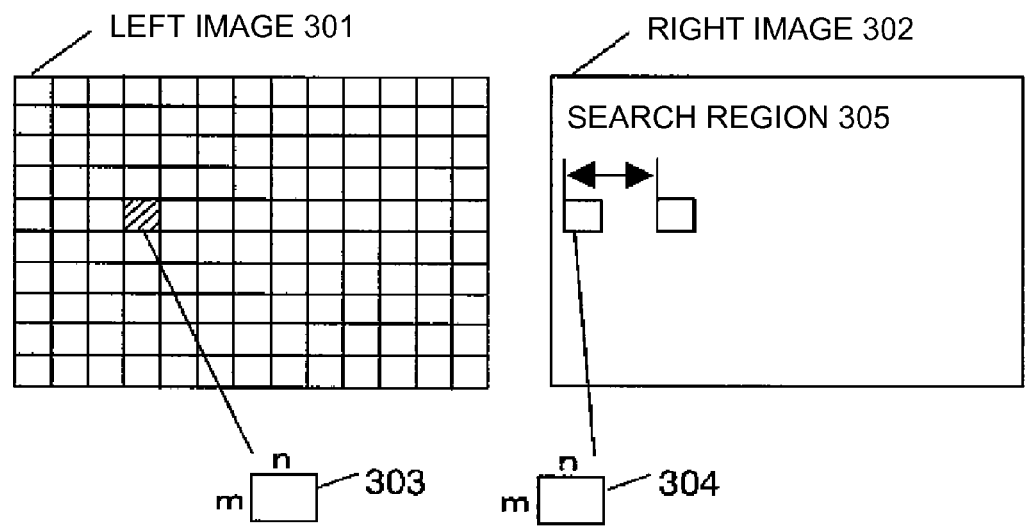
FIG. 3 explains the method for evaluating similarity between images according to the first embodiment of the present invention.

A method for evaluating the similarity will now be described. By way of example, the method described in "Driving assistance system using three-dimensional image recognition technology", Saneyoshi et al., Proceedings of Technical Paper Presentation, 924, pp. 169-172, (1992-10), Society of Automotive Engineers of Japan will be described with reference to FIG. 3. In this method, the left image is used as the reference and the left image 301 is divided into blocks 303. The block 303 is a unit of division and the size of the block 303 is n*m pixels. In the method, each divided block in the right image 302 is then searched for the corresponding area and the parallax d is determined. In this method, the following equation is used as a similarity evaluation equation to determine the corresponding area.

$$C = \Sigma |Li - Ri|$$

where Li and Ri represent brightness of the i-th pixel in the left and right blocks 303 and 304, respectively. A similarity evaluation value C will be calculated across a search region 305 by moving the right block 304 by one pixel at a time. The position where the similarity evaluation value C becomes the minimum is determined as the corresponding area. Such similarity evaluation is performed for each block in the left image 301. In this way, three-dimensional information on all blocks in the left image 301 can be determined. The three-dimensional information includes the parallax or the distance z obtained by conversion using the equations described above.

As described above, three-dimensional information on the monitoring space can be measured by using stereoscopic image processing. In addition to the method described above, there have been proposed other various stereoscopic image processing-based three-dimensional measurement methods. The present invention is not limited to the three-dimensional measurement method described above.

Figure 4:
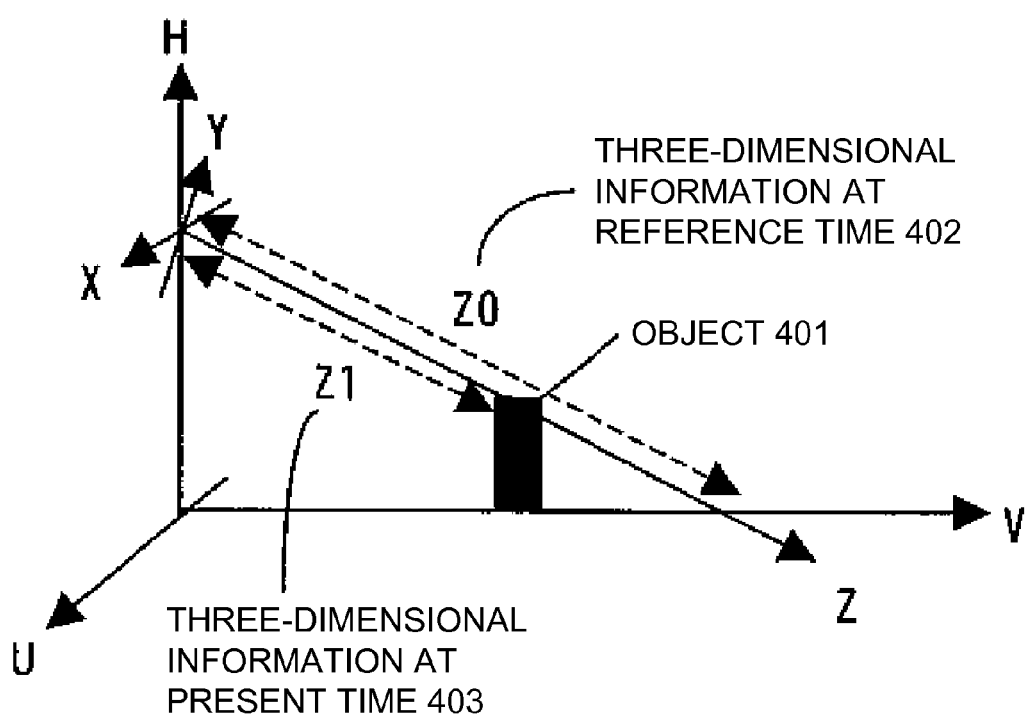
FIG. 4 explains the method for detecting a three-dimensional object according to the first embodiment of the present invention.

The three-dimensional object detecting section 105 detects a three-dimensional object in the monitoring space based on the three-dimensional information calculated by the three-dimensional information calculating section 104. In a method for detecting a three-dimensional object, for example, the present three-dimensional information is compared with the three-dimensional information at a reference time, and a portion showing any change is detected as a three-dimensional object. The method for detecting a three-dimensional object will be described with reference to FIG. 4.

Let Z0(X, Y) be three-dimensional information 402 at the reference time. As the three-dimensional information 402 at the reference time, information at the time when no three-dimensional object is present is selected. Suppose that an object 401 appears in the imaging space at a later time and let Z1(X, Y) be three-dimensional information 403 at that time. At this point, three-dimensional information in the area corresponding to the object 401 changes and the amount of the change is calculated. When the amount of change is larger than a predetermined threshold value ZTH, it is considered that an object has appeared. That is, when the following equation is satisfied, it can be judged that a three-dimensional object has appeared at the coordinates (X, Y).

$$Z0(X, Y) - Z1(X, Y) \geq ZTH$$

When it is judged that an object is present, object information OBJ(X, Y) is set as follows:

$$OBJ(X, Y) = 1$$

Otherwise, the object information OBJ(X, Y) is set as follows:

$$OBJ(X, Y) = 0$$

Figure 5:
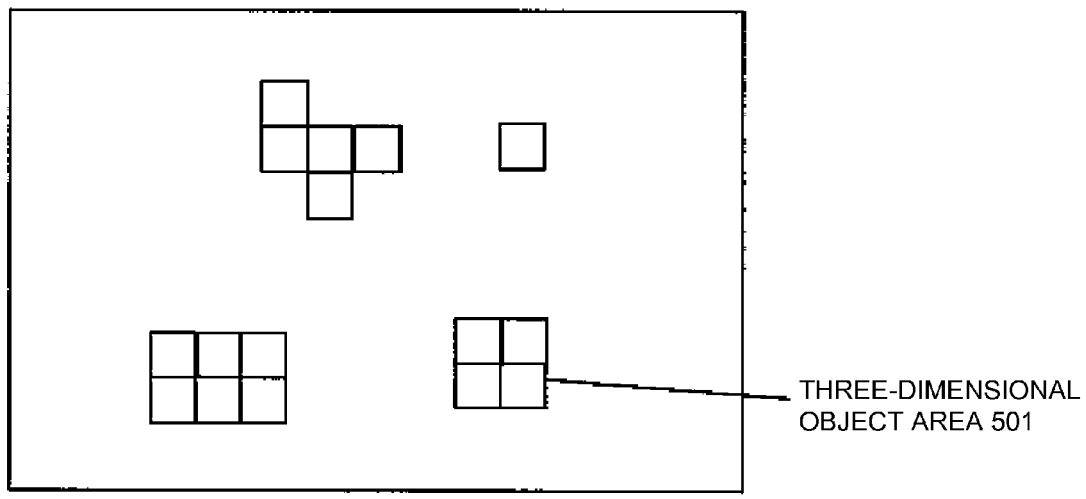
FIG. 5 explains the labeling process according to the first embodiment of the present invention.
Figure 5:
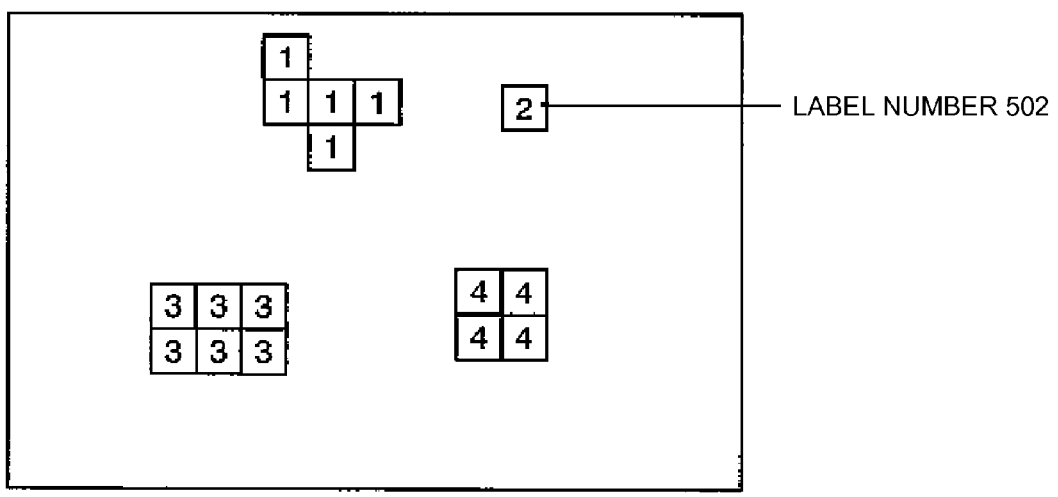

Then, a labeling process is performed on the area judged as a three-dimensional object, and the three-dimensional object is detected as a mass. The labeling process will now be described with reference to FIG. 5.

The labeling process is applied to adjacent areas in four directions, that is, horizontal and vertical directions (may be applied to adjacent areas in eight directions, including oblique directions). When an adjacent area is a three-dimensional object area 501, the same label number 502 is assigned to that area. The labeling process is performed on the entire image. In this way, the same label number will be assigned to each mass of a three-dimensional object area. As will be seen from the labeling result 503, each three-dimensional object area is detected as a mass. That is, the areas in which OBJ(X, Y)=1 is satisfied and to which the same label number is assigned are considered to form one mass.

Figure 6:
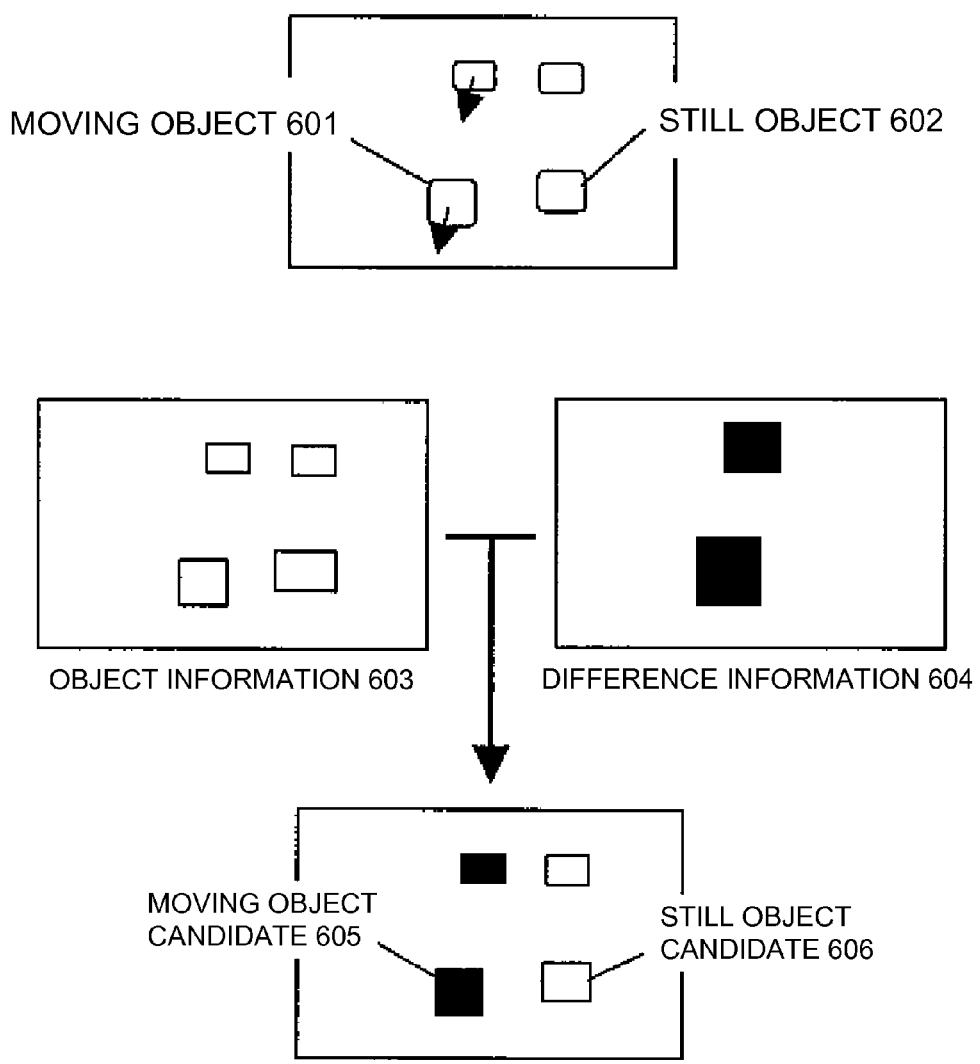
FIG. 6 explains the method for extracting an object candidate according to the first embodiment of the present invention.

The object candidate extracting section 106 extracts a moving object candidate and a still object candidate based on the change in brightness in the image area corresponding to the object detected by the three-dimensional object detecting section 105. The object candidate extracting section 106 extracts an object showing a large brightness change as a moving object candidate and an object showing a small brightness change as a still object candidate. An example of a method for calculating a candidate area will be described with reference to FIG. 6. In this example, a moving object 601 and a still object 602 are mixed in the imaging space and these objects will be detected.

The object candidate extracting section 106 calculates "the number of pixels which show differences S1" and "the number of pixels which show no differences S0" in each mass of the three-dimensional object detected by the three-dimensional object detecting section 105. In the area of one three-dimensional object, object information 603 is OBJ(X, Y)=1 and the same label number is assigned. The number of pixels S1 is obtained by counting the pixels that have the following SBN(X, Y) value in the area of the one three-dimensional object. The SBN(X, Y) is difference information 604 and has been calculated by the brightness change calculating section 103.

$$SBN(X, Y)=1$$

The number of pixels S0 is obtained by counting the pixels that have the following SBN(X, Y) value in the area of the one three-dimensional object.

$$SBN(X, Y)=0$$

When the following relationship holds true, the object in question is a moving object candidate 605.

$$S1>S0$$

When the following relationship holds true, the object in question is a still object candidate 606.

$$S1<S0$$

The object judging section 107 judges that the object candidate area extracted by the object candidate extracting section 106 is an object when the object candidate area is larger than a predetermined size. The object judging section 107 counts the number of pixels in the area in which OBJ(X, Y)=1 is satisfied and to which the same label number is assigned. The counted number of pixels becomes the size of the object candidate. When the number of pixels is larger than a predetermined threshold value RTH, the object judging section 107 judges the object candidate area is an object. The predetermined threshold value RTH is determined according to the type of the subject to be detected as an object.

The position change calculating section 108 calculates the change in position only for the object judged as a moving object.

The position change calculating section 108 performs the calculation process on the object judged as a moving object by the object judging section 107. The position change calculating section 108 determines the change between the position of the moving object detected at a preceding time and the present position of the moving object. An example of a method for calculating the change in position is calculating the change in position of the center of gravity of the moving object area.

The position change calculating section 108 calculates the positions of the centers of gravity of all moving object areas detected at the preceding time as well as the positions of the centers of gravity of all moving object areas detected at the present time. The position change calculating section 108 then determines that the position of the center of gravity of each object detected at the preceding time has moved to the closest present position of the center of gravity. Suppose the present position of the center of gravity of an object is not judged as the position to which the object has moved from the preceding position of the center of the gravity. In this case, the object in question is considered as a newly appeared object.

From then on, the change in position of that object is calculated. Suppose the position calculating section 108 cannot judge a present position to which an object has moved from the preceding position of the center of the gravity. In this case, it is considered that the object in question has disappeared and the calculation of the change in position of that object is terminated.

Finally, the object detecting section 109 detects only an object that has undergone a predetermined motion. For example, when the object detecting section 109 detects an object that has moved into a predetermined area in the image, the object detecting section 109 makes reference to the change in position of that object calculated by the position change calculating section 108. When the position of the center of the gravity of the object was outside the predetermined area at a preceding time and has moved in the predetermined area at the present time, the object detecting section 109 detects the object in question.

In this way, the object detector according to the first embodiment of the present invention detects a three-dimensional object based on three-dimensional information, uses a frame difference to calculate the change in brightness, and judges whether the three-dimensional object is a moving object or a still object (static object). This procedure allows accurate detection of a still object without using background difference processing.

Figure 7:
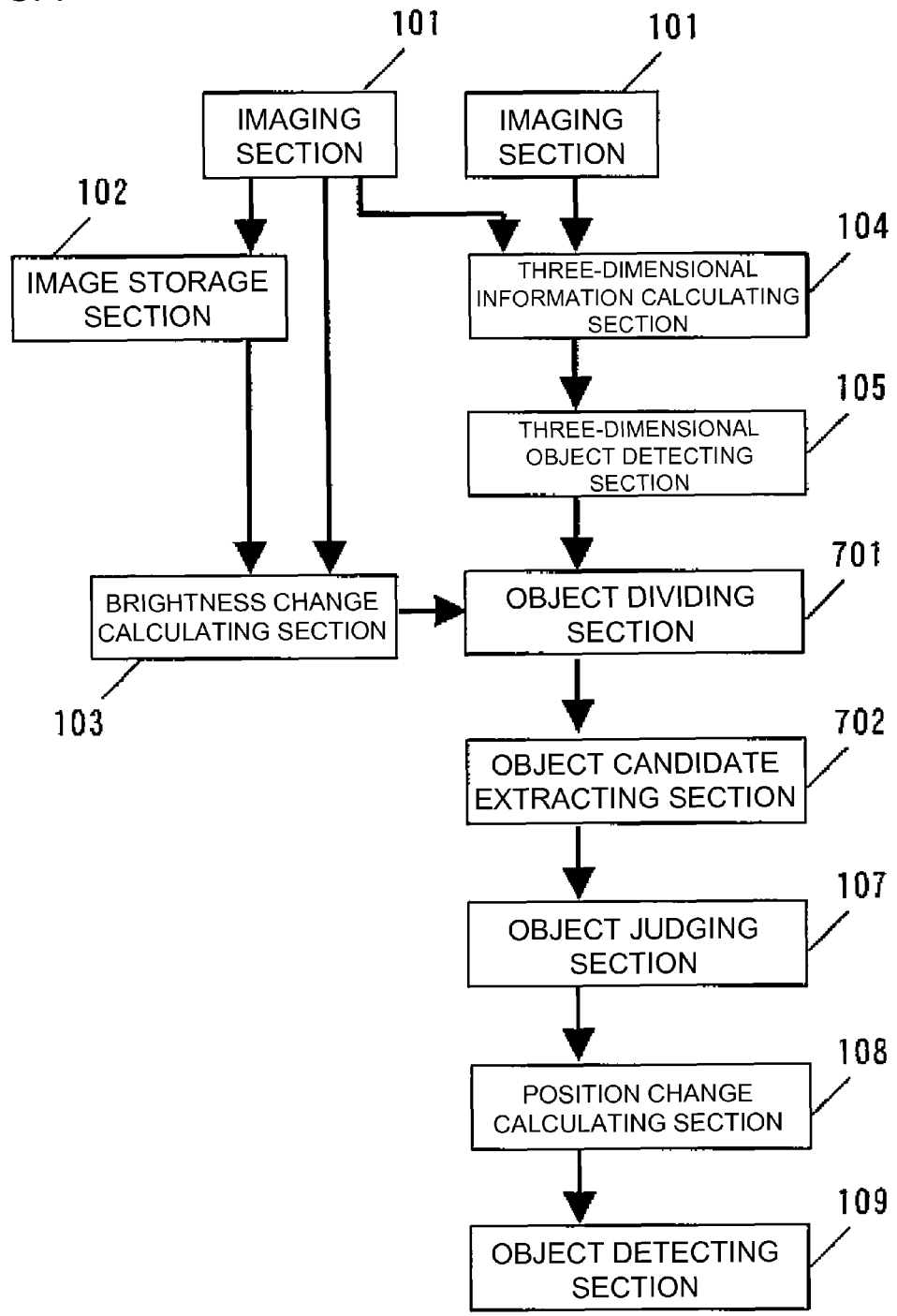
FIG. 7 is a block diagram of the object detector according to the second embodiment of the present invention.

Next, FIG. 7 shows the object detector according to a second embodiment of the present invention.

In FIG. 7, the imaging sections 101, the image storage section 102, the brightness change calculating section 103, the three-dimensional information calculating section 104, the three-dimensional object detecting section 105, the object judging section 107, the position change calculating section 108 and the object detecting section 109 are the same as those in the first embodiment. The object detector shown in FIG. 7 further includes an object dividing section 701 and an object candidate extracting section 702. The object dividing section 701 divides the image area corresponding to the object detected by the three-dimensional object detecting section 105 into the portion showing a large brightness change and the portion showing a small brightness change. The object candidate extracting section 702 extracts each of the divided areas obtained from the object dividing section 701 as a moving object candidate or a still object candidate.

The operation of the thus configured object detector will now be described.

Firstly, the imaging sections 101, the image storage section 102, the brightness change calculating section 103, the three-dimensional information calculating section 104 and the three-dimensional object detecting section 105 perform the same operations as those in the first embodiment so as to calculate the difference information SBN(X, Y) and the object information OBJ(X, Y).

The object dividing section 701 divides the image area corresponding to the object detected by the three-dimensional object detecting section 105 into the portion showing a large brightness change and the portion showing a small brightness change. The object dividing section 701 extracts coordinates (X, Y) that satisfy the following conditions as the portion showing a large brightness change in the object area.

$$OBJ(X, Y)=1 \text{ and } SBN(X, Y)=1$$

When the above conditions are satisfied, object brightness change information K(X, Y) is set as follows:

$$K(X, Y)=1$$

On the other hand, the object dividing section 701 extracts coordinates (X, Y) that satisfy the following conditions as the portion showing a small brightness change in the object area.

$$OBJ(X, Y)=1 \text{ and } SBN(X, Y)=0$$

When the above conditions are satisfied, the object brightness change information K(X, Y) is set as follows:

$$K(X, Y)=0$$

The object candidate extracting section 702 extracts a moving object candidate area and a still object candidate area from the object area based on the object brightness change information K(X, Y).

Thereafter, the labeling process is performed on the object brightness change information K(X, Y). Then, each of the moving object candidate areas and the still object candidate areas is extracted as a mass. That is, the moving object candidate is an area in which K(X, Y)=1 is satisfied and to which the same label number is assigned. Such an area is extracted as the moving object candidate. The still object candidate is an area in which K(X, Y)=0 is satisfied and to which the same label number is assigned. Such an area is extracted as the still object candidate.

Thereafter, the object judging section 107, the position change calculating section 108 and the object detecting section 109 perform the same operations as those in the first embodiment so as to detect an object.

In this way, the object detector according to the second embodiment of the present invention detects a three-dimensional object area based on the three-dimensional information and divides the three-dimensional object area according to whether or not there is a brightness difference. This allows separation between a moving object and a still object as well as accurate detection of the moving object.

Figure 8:
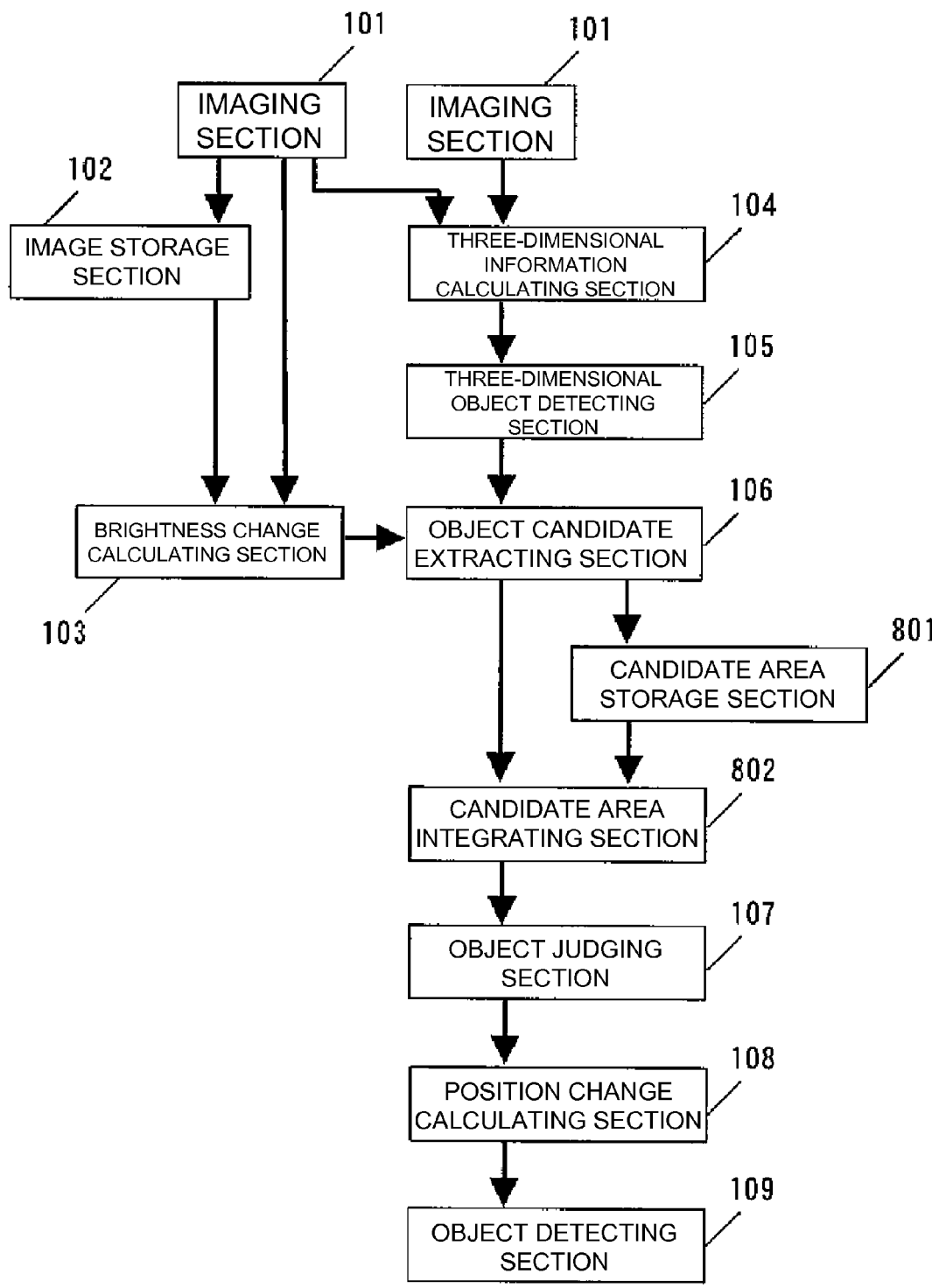
FIG. 8 is a block diagram of the object detector according to the third embodiment of the present invention.

Next, FIG. 8 shows the object detector according to a third embodiment of the present invention.

In FIG. 8, the imaging sections 101, the image storage section 102, the brightness change calculating section 103, the three-dimensional information calculating section 104, the three-dimensional object detecting section 105, the object candidate extracting section 106, the object judging section 107, the position change calculating section 108 and the object detecting section 109 are the same as those in the first embodiment. The object detector shown in FIG. 8 further includes a candidate area storage section 801 that stores an object candidate area extracted by the object candidate extracting section 106, and a candidate area integrating section 802 that integrates candidate areas stored during a predetermined continuous period (time) in the candidate area storage section 801.

The operation of the thus configured object detector will now be described.

Firstly, the imaging sections 101, the image storage section 102, the brightness change calculating section 103, the three-dimensional information calculating section 104, the three-dimensional object detecting section 105 and the object candidate extracting section 106 perform the same operations as those in the first embodiment so as to extract a moving object area and a still object area.

The candidate area storage section 801 successively stores the object candidate area extracted by the object candidate extracting section 106.

The candidate area integrating section 802 then integrates information on the still objects stored during the predetermined continuous period in the candidate area storage section 801 so as to generate an integrated candidate area.

An example of a method for integrating information on the still objects is adding their areas. Suppose that the process of extracting a candidate area is performed "N" times during the predetermined continuous period. In this case, the number of pieces of still object area information to be generated is "N." These "N" pieces of area information are added.

The candidate area integrating section 802 calculates the number of judgment M for each coordinate point (X, Y) for the "N" pieces of still object area information. The number of judgment M is the number indicating how many times each coordinate point is judged as a still object area. When the number M is larger than a predetermined threshold value MTH, the candidate area integrating section 802 outputs the coordinate point (X, Y) in question as a still object area. When the number M is smaller than the threshold value MTH, the candidate area integrating section 802 will not handle the coordinate point (X, Y) in question as a still object area.

The candidate area integrating section 802 does not process a moving object area but outputs its area information outputted from the object candidate extracting section 106 as it is. The candidate area integrating section 802 outputs thus processed result as a final integrated candidate area.

Thereafter, the object judging section 107, the position change calculating section 108 and the object detecting section 109 perform the same operations as those in the first embodiment so as to detect an object.

In this way, the object detector according to the third embodiment of the present invention adds the candidate area information to accurately detect a still object whose feature is not easily captured.

Figure 9:
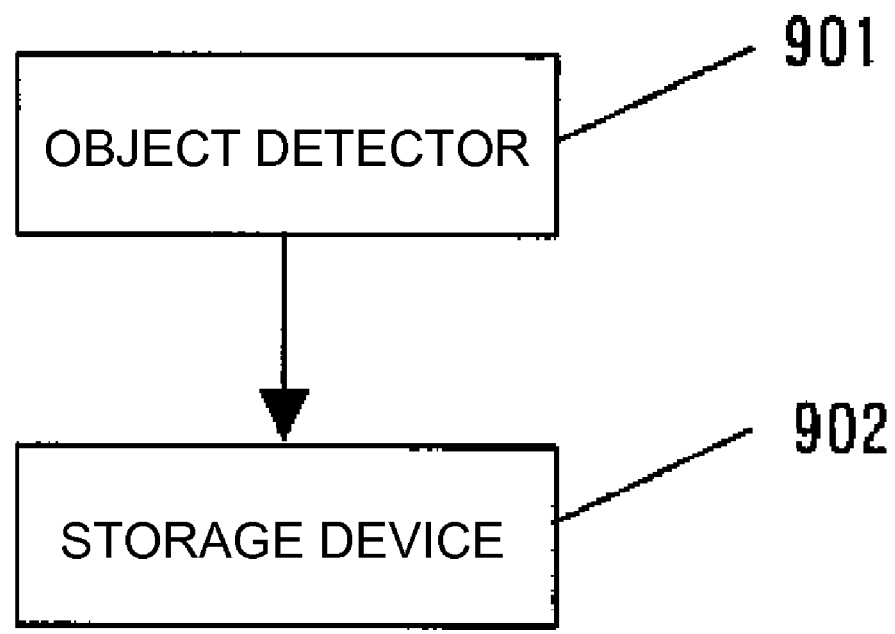
FIG. 9 is a block diagram of the object detection system according to the fourth embodiment of the present invention.
Figure 10:
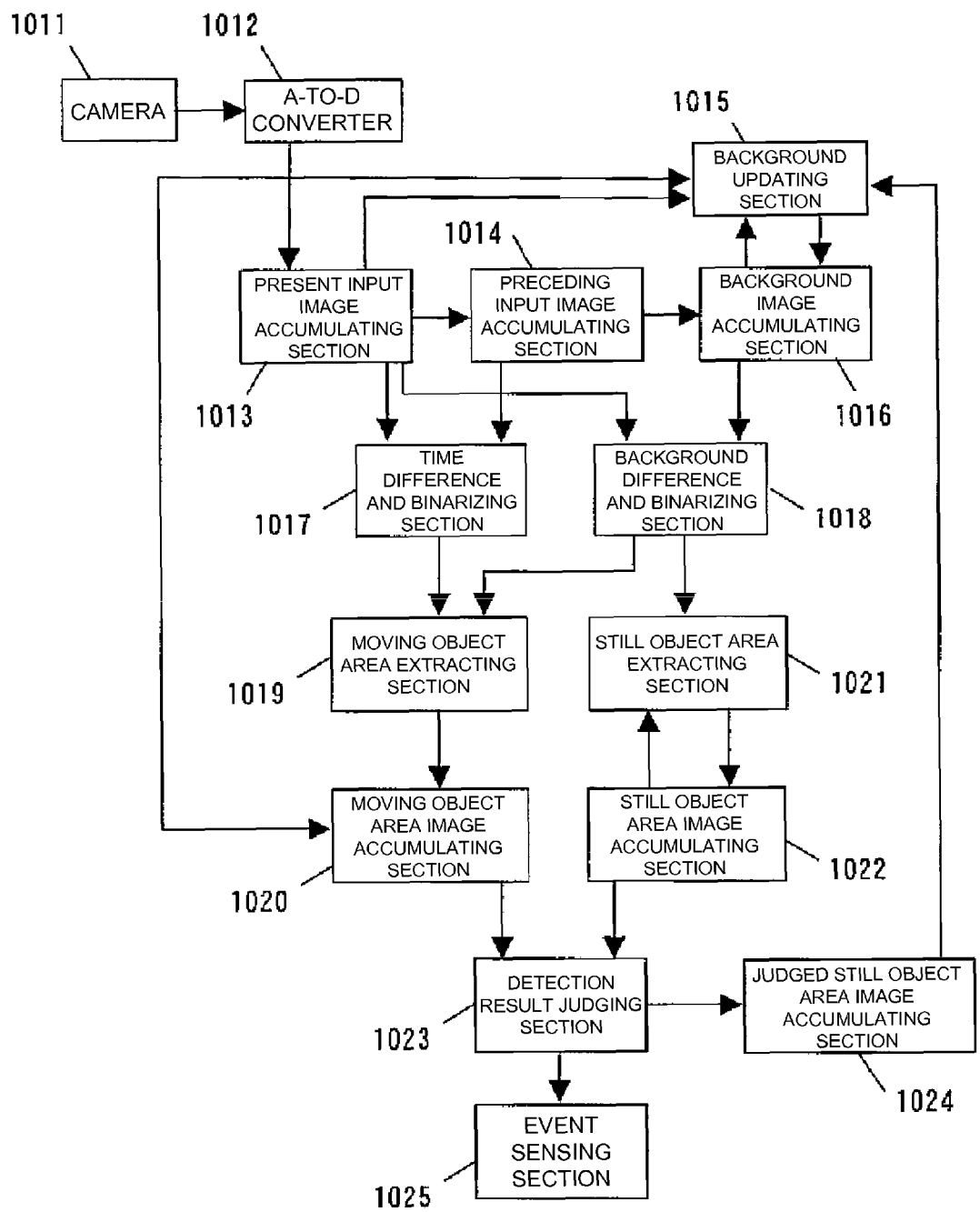
FIG. 10 is a block diagram of a conventional object detector.

Next, FIG. 9 shows the object detection system according to a fourth embodiment of the present invention.

In FIG. 9, the object detection system according to this embodiment includes an object detector 901 that performs operations similar to those in any one of the first to third embodiments and a storage device 902 that, when the object detector 901 detects an object, stores the information on the object.

The object detector 901 performs operations similar to those in the first embodiment to detect only an object that has undergone a predetermined motion.

When the object detector 901 detects an object at a certain time, the storage device 902 stores the image at that time and/or specification information on the detected object. The image at that time that the storage device 902 stores is the image outputted from the imaging section 101. The specification information on the object that the storage device 902 stores is the area information on the object detected by the object detecting section 109.

In this way, the object detection system according to the fourth embodiment of the present invention can detect an object that has undergone a predetermined motion and store the information on the object.

Although the presently conceivable preferred embodiments of the present invention have been described, it is intended that those skilled in the art understand that various variations can be made to these embodiments and that the appended claims cover such all variations that fall within the true spirit and scope of the present invention.

INDUSTRIAL APPLICABILITY

As described above, the object detector according to the present invention provides an advantage of allowing accurate detection of a still object without using background difference processing, and is useful, for example, as an image recognition apparatus that detects an object from images obtained by imaging a monitoring space.

The invention claimed is:

1. An object detector comprising:
a plurality of imaging sections that image a predetermined monitoring space;
an image storage section that stores at least one of a plurality of images imaged by the plurality of imaging sections;
a brightness change calculating section that calculates the amount of change in brightness between the stored preceding image and the present image;
a three-dimensional information calculating section that calculates three-dimensional information from the plurality of images imaged by the plurality of imaging sections;
a three-dimensional object detecting section that detects a three-dimensional object in the monitoring space based on the three-dimensional information calculated by the three-dimensional information calculating section; and
an object candidate extracting section that extracts an object showing a large brightness change as a moving object candidate and an object showing a small brightness change as a still object candidate based on the change in brightness in the image area corresponding to the object detected by the three-dimensional object detecting section.

2. The object detector according to claim 1, further comprising:
an object judging section that judges that the object candidate area is an object when the object candidate area is larger than a predetermined threshold value;
a position change calculating section that calculates the change in position only for an object judged as a moving object; and
an object detecting section that detects only an object that has undergone a predetermined motion.

3. The object detector according to claim 1, further comprising:
an object dividing section that divides the image area corresponding to the detected object based on the three-dimensional information into the portion showing a large brightness change and the portion showing a small brightness change.

4. The object detector according to claim 1, further comprising:
a candidate area storage section that stores the still object candidate area;
a candidate area integrating section that integrates the still object candidate areas stored during a predetermined continuous period so as to generate an integrated area; and
an object judging section that detects the integrated area as a still object when the size of the integrated area is larger than a predetermined threshold value.

5. An object detection system comprising:
the object detector according to claim 1; and
a storage device that stores the image when the object detector has detected an object and/or specification information on the detected object.

6. A method for detecting an object comprising the steps of:
using a plurality of imaging sections to image a predetermined monitoring space;
storing at least one of a plurality of images imaged by the plurality of imaging sections;
calculating the amount of change in brightness between the stored preceding image and the present image;
calculating three-dimensional information from the images imaged by the plurality of imaging sections;
detecting an object in the monitoring space based on the three-dimensional information; and
extracting an object showing a large brightness change as a moving object candidate and an object showing a small brightness change as a still object candidate based on the change in brightness in the image area corresponding to the detected object.

7. The method for detecting an object according to claim 6, further comprising the steps of:
detecting an object candidate area as an object when the object candidate area is larger than a predetermined threshold value;
calculating the change in position only for the object judged as a moving object; and
detecting the object that has undergone a predetermined motion.

8. The method for detecting an object according to claim 6, wherein the image area corresponding to the detected object based on the three-dimensional information is divided into the portion showing a large brightness change and the portion showing a small brightness change so as to detect the moving object candidate and the still object candidate.

9. The method for detecting an object according to claim 6, further comprising the steps of:
storing the still object candidate area;
integrating the still object candidate areas stored during a predetermined continuous period to generate an integrated area; and
detecting the integrated area as a still object when the size of the integrated area is larger than a predetermined threshold value.

* * * * *